United States Patent [19]
Honnecke et al.

[11] Patent Number: 6,076,780
[45] Date of Patent: Jun. 20, 2000

[54] KNOCK-DOWN SHEET METAL PIPE STAND

[76] Inventors: Von Honnecke, 530 S. Coors Ct., Lakewood, Colo. 80228; Jerry R. Bartling, 1165 W. Custer Pl., Denver, Colo. 80223

[21] Appl. No.: 09/067,520

[22] Filed: Apr. 28, 1998

[51] Int. Cl.[7] .............................. F16L 3/08; E21F 17/02
[52] U.S. Cl. ........................... 248/70; 248/59; 248/74.3; 52/678
[58] Field of Search .............................. 248/74.1, 58, 49, 248/80, 89, 90, 237, 75, 70, 74.3, 60, 62, 74.2, 83, 146, 150, 152, 154, 370, 431, 165, 65, 440.1, 174, 243

[56] References Cited

U.S. PATENT DOCUMENTS

| | | | |
|---|---|---|---|
| D. 353,894 | 12/1994 | Nelson et al. | D25/118 |
| D. 367,329 | 2/1996 | Nelson et al. | D25/118 |
| 1,335,553 | 3/1920 | Brachtl | 248/73 |
| 1,809,055 | 6/1931 | McKee | 248/302 |
| 2,059,429 | 11/1936 | Anderson | 248/73 |
| 2,141,032 | 12/1938 | Cordell | 248/70 |
| 2,937,833 | 5/1960 | Sachs | 248/49 |
| 3,022,519 | 2/1962 | Lang | 248/27.1 |
| 3,105,423 | 10/1963 | Reiland | 52/677 |
| 3,368,564 | 2/1968 | Selix | 604/180 |
| 3,377,029 | 4/1968 | Montgomery | 239/458 |
| 3,648,468 | 3/1972 | Bowers | 248/48 |
| 3,739,435 | 6/1973 | Baker | 24/257 R |
| 4,033,534 | 7/1977 | Bergkvist | 248/49 |
| 4,309,008 | 1/1982 | Sirks | 248/105 |
| 4,406,434 | 9/1983 | Schneckloth | 248/83 |
| 4,445,656 | 5/1984 | Leitch et al. | 248/49 |
| 4,513,934 | 4/1985 | Pruyne | 248/49 |
| 4,555,082 | 11/1985 | Sack et al. | 248/220.1 |
| 4,671,404 | 6/1987 | Wall et al. | 206/45.14 |
| 4,858,863 | 8/1989 | Lin | 248/174 |
| 4,896,820 | 1/1990 | Harrington | 229/100 |
| 4,953,340 | 9/1990 | Anderson | 52/684 |
| 5,040,751 | 8/1991 | Holub | 248/62 |
| 5,072,901 | 12/1991 | Scott | 248/49 |
| 5,092,547 | 3/1992 | Richards | 248/62 |
| 5,217,191 | 6/1993 | Smith | 248/55 |
| 5,411,141 | 5/1995 | Bounds | 206/553 |
| 5,685,508 | 11/1997 | Smith | 248/55 |
| 5,819,493 | 10/1998 | LeMoignan | 52/678 |
| 5,890,683 | 4/1999 | DePietro | 248/58 |

*Primary Examiner*—Anita M. King
*Assistant Examiner*—Michael Nornberg
*Attorney, Agent, or Firm*—Thomas H. Hanson

[57] ABSTRACT

A support stand for pipe, conduit, cable or the like which must be held above the surface of a roof. The stand is essentially triangular with the base of the stand forming one side and two legs, joined at their upper ends, forming the other two sides. A strap is fixed at one end to the face of one of the legs and extends upward, over the top of the stand and down the other side. There, it passes around the pipe, etc., to be supported, which rests against the face of the second leg, and then back over the top of the stand and downward past the first end. The free end passes through a tab bridge formed in, or attached to, the first leg. The height at which the pipe is supported is adjusted by altering the length of the free end which passes through the tab bridge. When the height is correct, the strap is folded back over the tab bridge to lock it in position. Preferably, the entire stand, including the strap, is made from sheet metal and the legs are of unequal length. Also preferably, the two legs are formed as a single piece which is shipped flat, and bent to form the two legs and attached to the base at the job site, using tabs inserted into tab bridges or slots, providing a knock down stand which can be assembled without tools.

13 Claims, 10 Drawing Sheets

KNOCK-DOWN SHEET METAL PIPE STAND

FIELD OF THE INVENTION

This invention relates to the field of stands or supports for pipe or cables and more specifically for such stands that are used to support pipes above the roof of a building.

BACKGROUND OF THE INVENTION

Where equipment such as air handling units is placed on the roof of a building, various pipes, cables, and conduits will have to be run to the equipment. In a similar manner cables and wiring to antennas and other structures are run across the roof. Most building codes require that these pipes, cables, etc. be raised above the surface of the roof, typically at a height of 10 to 12 inches above the surface. Multiple supports will be needed, spaced along the length of the item being supported. The number and spacing of the supports will depend on the stiffness of the item.

Often, the roof over which the pipe is run will be uneven. This may be due to irregularity in the underlying structure; bulging in the roofing material; or stepped levels of the roof itself. It may be necessary for the pipe to be run level or at a consistent slope which is unaffected by the unevenness of the roof. This requires supports which can vary the height at which they support the pipe or cable. Some of the supports currently available are not adjustable. The use is this type of support can result in unsupported spans or, in extreme cases, a support dangling from a pipe rather than supporting it. Examples of fixed height supports are disclosed in U.S. Pat. Nos. D353,894 and D367,329 to Nelson et al. and 5,072,901 to Scott.

Two common approaches to providing an adjustable support are stackable stands, which provide incremental height changes and threaded adjustment built into the stand. The height increments provided by the stackable approach may not provide the degree of adjustment needed. The designs which utilize threaded adjustment are typically heavy and/or large. Weight and size are especially important where large numbers of supports are used. A business which uses such stands regularly must store large numbers of stands. All users will have to ship the stands to the job site and then transport them to the rooftop.

U.S. Pat. No. 4,513,934 to Pruyne discloses a stackable design. U.S. Pat. Nos. 4,445,656 to Leitch, 5,217,191 and 5,685,508 to Smith, and 5,040,751 to Holub disclose various forms of supports with threaded adjustment. The Smith designs, in particular, utilize a heavy concrete base.

U.S. Pat. No. 4,033,534 to Bergkvist discloses an approach in which height variation is achieved by embedding the lower end of the support in a cast material, such as concrete at the time of installation. This approach has the shortcoming that it can not be adjusted at a later time.

Applicants have sold a previous version of the present invention in which the support member was attached to the base, and the strap was attached to the support, at the time of manufacture. Both sheet metal screws and spot welding were found to be satisfactory methods of attachment. While functional, and providing adjustability, the stand could not be shipped in a knock-down configuration, and required tools for assembly. This resulted in inefficient storage and shipping of the stand as the assembled stand occupies significant space.

Most of the existing designs require tools or supplemental fasteners to assemble or adjust. The tools may not be immediately available, and fasteners easily become lost or are dropped.

There is a need for an adjustable stand which provides fine variations in support height; which is compact to store and ship and is low in weight. The stand should be capable of being shipped and stored in a knocked down form, and assembled on the rooftop at the job site, by unskilled labor, without the use of tools or additional fasteners. The range of variation in support height should be at least +/−2 inches to accommodate different building code requirements and unevenness in roof height. Additionally, the stand should be inexpensive to manufacture.

SUMMARY OF THE INVENTION

The present invention is directed to a stand for supporting pipe or cable at a variable height above a roof.

According to the invention there is provided a base plate; an upwardly extending support, comprised of two legs joined together at their upper ends; and a strap, attached to the support, which encircles and supports the pipe. Preferably, the legs are of unequal length, and are formed from a single piece of material.

According to an aspect of the invention the strap is fixed to the support at one end while the other passes through a tab bridge, or loop. The amount of strap available to support the pipe is adjusted by varying the length of strap pulled through the tab bridge. This, in turn, varies the height at which the pipe is supported. In the preferred embodiment, a range of +/−4 inches is provided. When the height is correct, the strap is folded back over the tab bridge to lock it in position. This adjustment procedure can be performed without the use of tools of any kind. The fixed attachment of the first end of the strap is achieved in a similar manner. Should the strap need replacing, it can be done in the field, without tools. Preferably, the strap is formed from sheet metal, allowing it to hold its position when folded.

According to another aspect of the invention the strap is attached to the first leg of the support and passes over the top of the support and down the face of the second leg before it encircles the pipe and again passes over the top, before being routed through the tab bridge on the first leg.

Further in accordance with the invention the support is attached to the base using tabs which are inserted into tab bridges and folded back to lock. The stand is shipped to the job site in a knocked down configuration in which the legs of the support are still aligned in the same plane and are not attached to the base. At the job site, the fold is made between the two legs, the tabs are inserted into the tab bridges and folded to lock them in place.

The advantages of such an apparatus are a strong, lightweight stand which is compact to store and ship; easy to use; inexpensive to manufacture; and which can be assembled by unskilled labor without requiring the use of tools of any kind. The stand is easily attached to the pipe and adjusted to provide the correct support height. Sufficient range of adjustment is provided to allow a single size of stand to accommodate variations in roof height due to unevenness or steps in the roof and differences in building codes. Variation in support height is continuous rather than incremental, providing very fine adjustment. In addition to requiring no tools, the stand requires no supplemental fasteners such as screws, bolts, or brackets which can become separated from the stand and lost, or which can strip out, rendering the stand unusable.

The above and other features and advantages of the present invention will become more clear from the detailed description of a specific illustrative embodiment thereof, presented below in conjunction with the accompanying drawings.

BRIEF DESCRIPTION OF THE DRAWING

FIG. 12 is a detailed view of an alternative method of forming the tabs and lower ends of the support.

DESCRIPTION OF THE PREFERRED EMBODIMENT

The following discussion focuses on the preferred embodiment of the invention, in which a sheet metal stand is used to support a pipe or cable above the surface of a roof. However, as will be recognized by those skilled in the art, the disclosed apparatus is applicable to a variety of situations in which support of a tubular member above a surface is desired.

The following is a brief glossary of terms used herein. The supplied definitions are applicable throughout this specification and the claims unless the term is clearly used in another manner.

Hinged—any joint which allows relative rotational movement between two members, whether by rotation of two or more parts, by flexion of a single piece or material, or by other equivalent means.

Base Plate—generally, the horizontal plate affixed to the bottom of the support which bears against the roof or other supporting surface.

Tab bridge—a raised arch with both ends attached, which has a gap underneath for receiving a tab. It is typically formed by stamping a slot in a metal sheet without shearing the ends. A tab bridge is considered to be equivalent to a loop of similar profile which is affixed to the surface.

Pipe—generally the tubular member being supported by the inventive stand. The term is intended to include pipes, conduits, cables, or any other elongated tubular member which requires support. Typically, only pipe will be referred to herein for simplicity and clarity of description.

Slot—an opening, elongated in one dimension, through which a strap or tab can be inserted.

Support—generally the portion of the stand which extends upward from the base plate and bears against the pipe being supported. In the preferred embodiment, the support is formed from two hinged legs and is generally triangular in cross-section, where the third side of the triangle is the base plate.

The disclosed invention is described below with reference to the accompanying figures in which like reference numbers designate like parts.

Features and Use of the Preferred Embodiment

Figure 1:
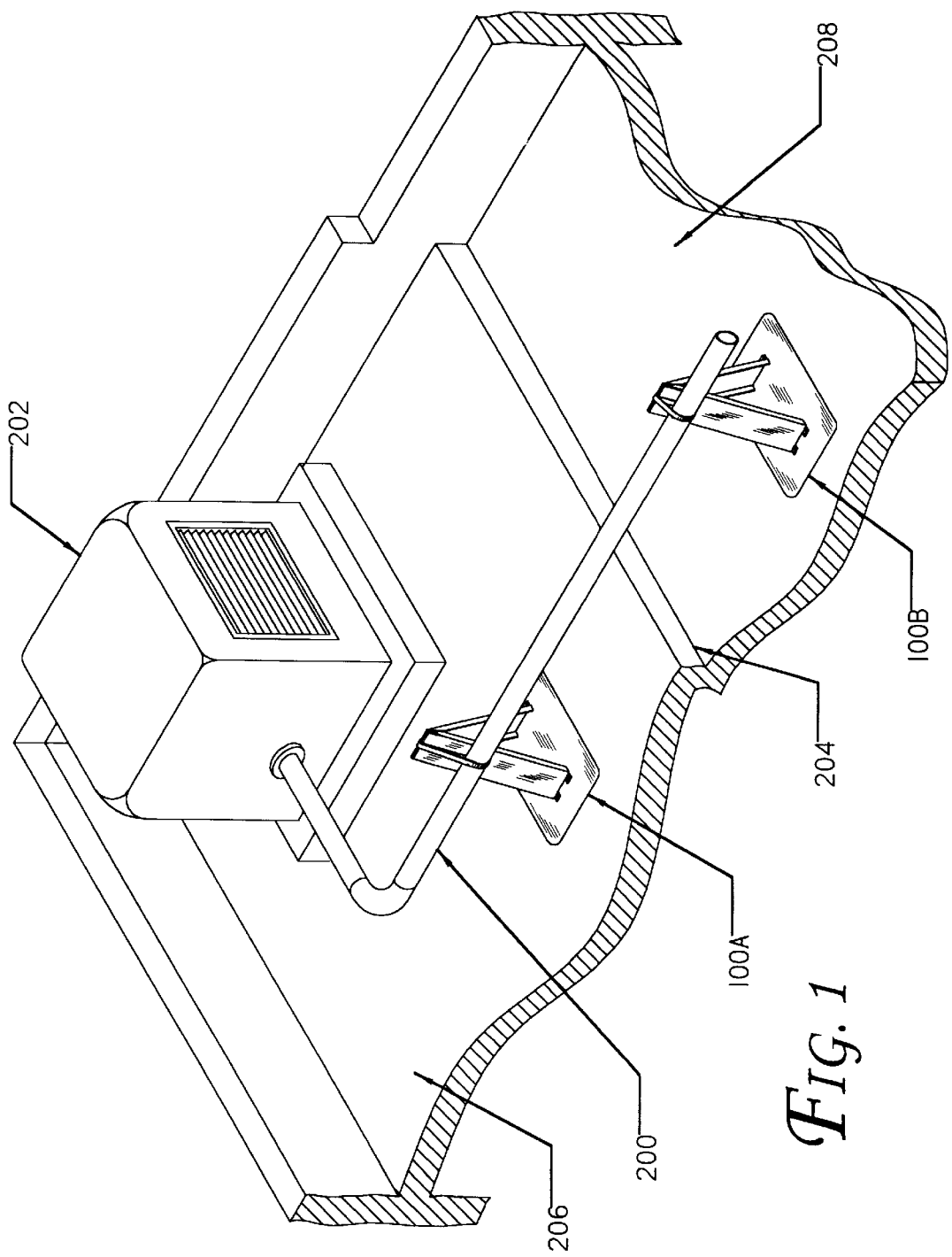
FIG. 1 illustrates several instances of the invention in use supporting a pipe.

The present invention is a support stand for use in a rooftop environment such as that illustrated in FIG. 1. Building codes typically require that pipes and cables, such as pipe 200 which serves air conditioning unit, 202, which are run across a roof be supported above the surface of the roof. Heating, cooling and plumbing pipes, power cables, telecommunication cables and a variety of other types of pipe, cable and conduit must be supported in this manner. The required height varies by municipality, but 10 inches to 12 inches is common. Long spans will have to be supported at several points along their length. This task is made more difficult by roofs which are uneven or which are stepped, as at 204. Instances of the present invention, 100A and 100B, are easily placed as needed to support either a new or existing span and then adjusted to support the pipe at the appropriate height. As shown, the instance of the support stand, 100A, placed on the raised portion, 206, of the roof has been adjusted to support the pipe at a relatively lower height than the stand, 100B, which is placed on the lower portion, 208, of the roof. The result is a pipe which remains level even though the roof is uneven. The same result can be achieved with roofs that are uneven due to buckling or swelling of the roofing material.

Figure 2:
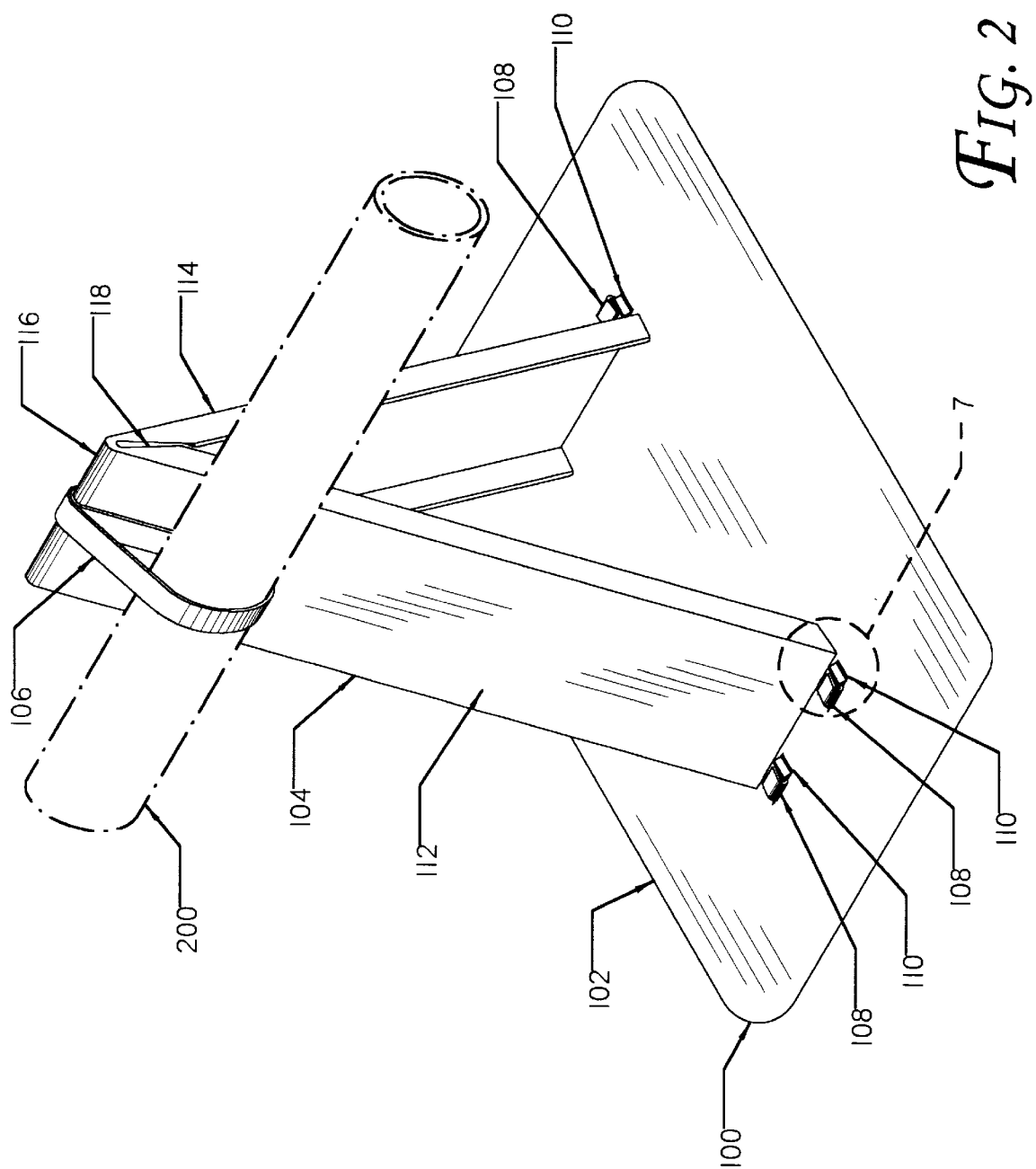
FIG. 2 is a perspective view of the present invention.

The inventive support stand, 100, is shown more clearly in FIG. 2. The stand is comprised of three main components: the base, 102; support, 104; and strap, 106. The strap extends from the rear side of the stand, 114, over the top, around the pipe, 200, and back over the top. Both ends are attached to the rear face of the stand as discussed below. The length of the strap can be adjusted to support the pipe at a range of positions along the face of the front leg, 112, of the support. In the preferred embodiment, the stand is 16 inches tall and provides an 8 inch range of adjustment for the support height. Within this range, very fine adjustment of the support height is available by altering the strap length. This adjustment is continuous rather than incremental as is provided by stackable stands. This allows a single stand to be used in a wide variety of situations, simplifying selection and stocking of stands for multiple projects. Tabs, 108, hold the support to the base. This method of joining allows the stand to be stored and shipped flat and assembled at the job site.

Figure 11:
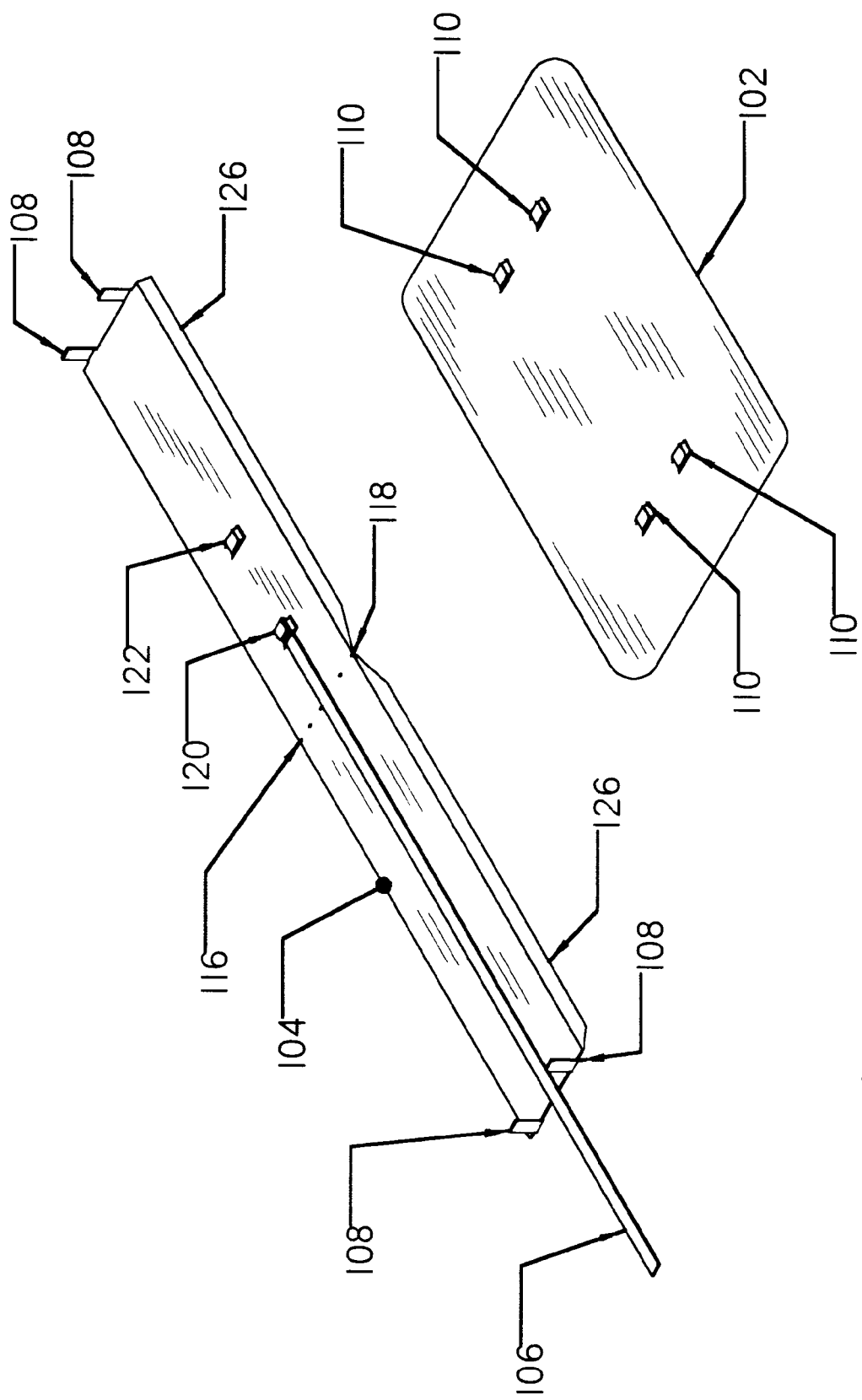
FIG. 11 illustrates the stand as manufactured, in its knocked down form.

FIG. 11 shows the stand as it is manufactured. Support, 104, is fully formed except that the fold, 116, between the front leg, 112, and the rear leg, 114, is not made. Strap, 106, is attached at one end and lies close along the face of the support. In this configuration the support is elongated and relatively flat, allowing it to be easily stacked. Sets of supports and bases can be stacked very compactly reducing storage and shipping space, and easing the handling of large numbers of stands. At the job site, the supports are bent in the middle to their approximate final shape, the four tabs, 108, are inserted into tab bridges, 110, and folded back over the top to secure them into place. The correct location of the bend is assured by the notches, 118, in the sides of the support. After the tabs are secured, a strong, stable triangulated structure is formed. A stand can be assembled in a very short time by unskilled workers, without using tools of any kind. If it becomes necessary to replace a strap for any reason, this can also be accomplished without using tools by unfolding the end of the existing strap, removing the strap, inserting the end of a new strap, and folding its end over the tab bridge.

Structure of the Preferred Embodiment

Figure 3:
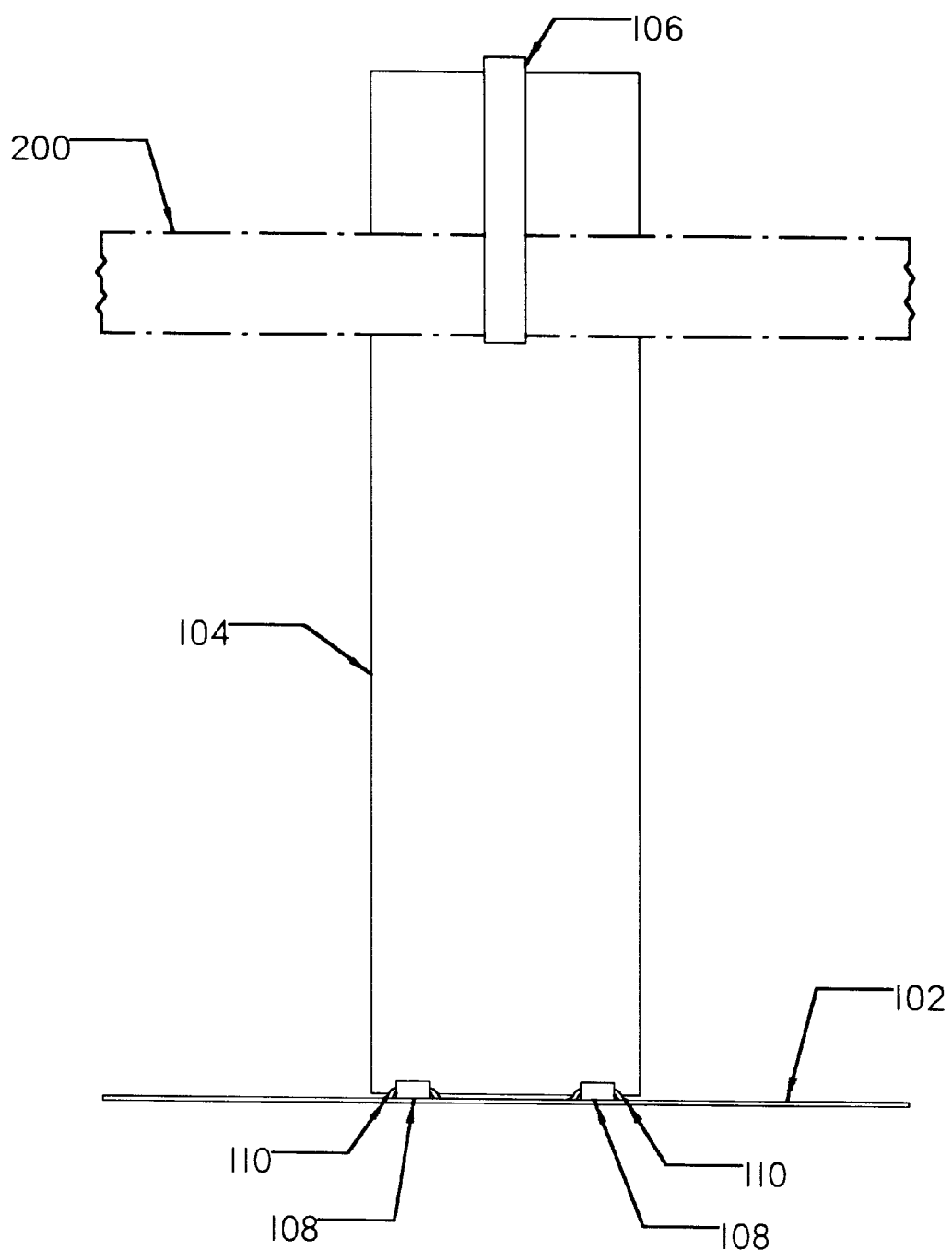
FIG. 3 is a front view of the invention.

The front view of FIG. 3 illustrates the relative side to side positioning of the elements of the stand. Tabs, 108, are positioned near the outer edges of the support, 104, and couple to tab bridges, 110, in the base, providing lateral stability. The strap, 106, is centered on the support whereby the downward force resulting from the weight of the pipe, 200, is centered on the base plate and between the mounting tabs. Small lateral movements of the pipe are absorbed by flexing of the strap. Larger movements will cause the pipe to slip within the strap since is only loosely held.

Figure 4:
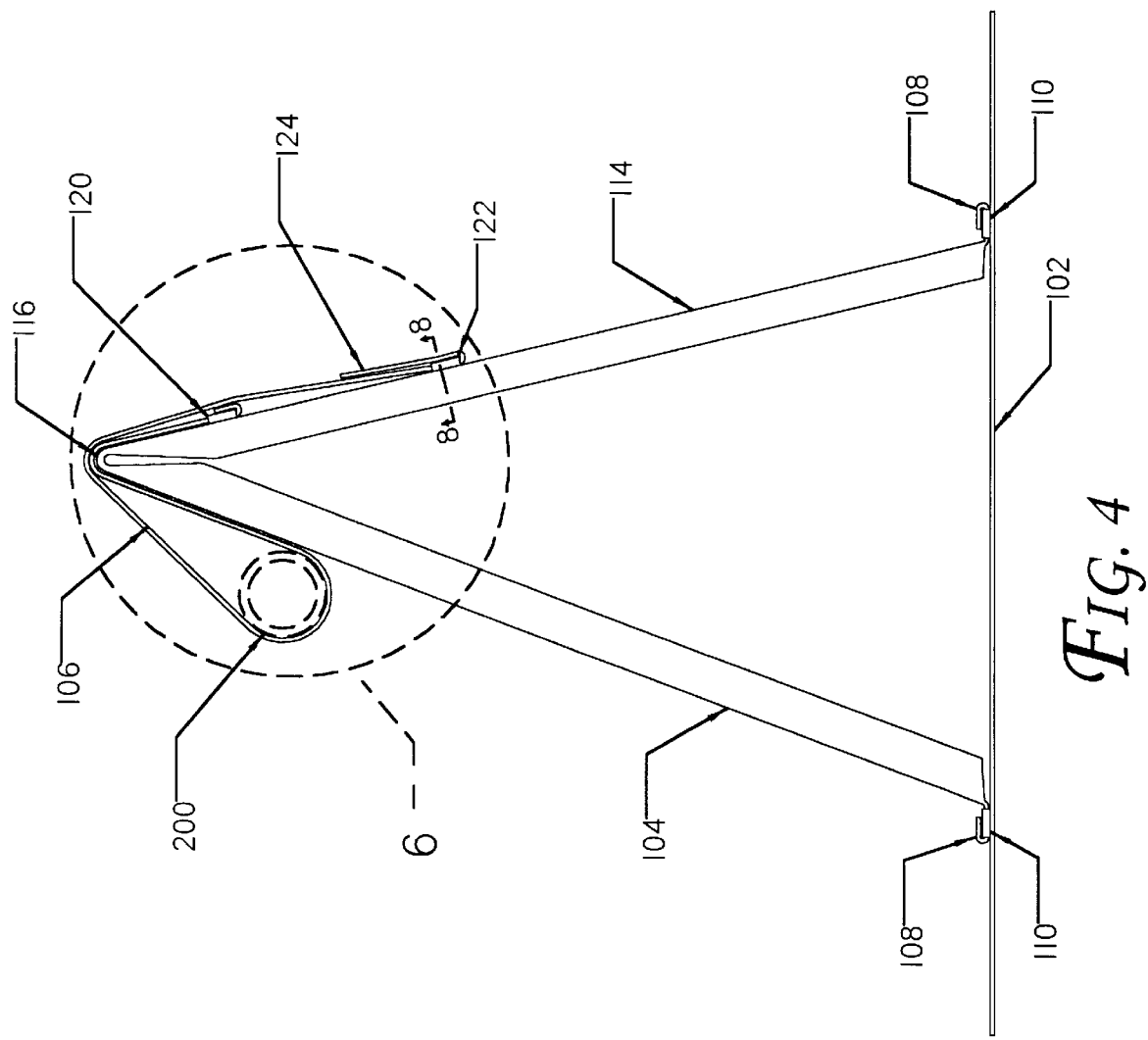
FIG. 4 is a side view of the invention.

The side view of FIG. 4 illustrates the relative front to rear positioning of the elements of the stand. Tabs, 108, and tab bridges, 110, are positioned in pairs near the ends of the base plate, 102. The tabs and tab bridges are arranged such that a downward force on the support will urge the tabs more deeply into the tab bridges, tightening the connection. The tabs and tab bridges also prevent the support from being lifted off of the base. The strap, 106, is attached to the rear leg, 114, at tab bridges 120 and 122, and passes over the top of the stand, 116, to reach the pipe. This is discussed in more detail below with reference to FIG. 6. The rear leg is slightly shorter than the front leg, offsetting the support, and the pipe, toward the rear. This serves to better center the load, which is carried on the front face, over the middle of the support and the base. The amount of this offset can be varied during manufacture to adapt the stand to various sizes of pipes and expected support heights. As shown, in the preferred embodiment the front and rear legs are formed from a single piece of material and a fold in that material forms the connection between the two legs, and allows the angular movement necessary to set up the stand. Alternatively, the legs could be formed separately and coupled by any of the well known methods which would allow angular movement while otherwise fixing their relative positions.

In the preferred embodiment, the base and support are manufactured from sheet metal. It would also be possible to manufacture these pieces from plastic using thermoform, extrusion, or injection molding. Proper selection of the plastic used would provide the rigidity necessary for the stand to function as described herein. Relative dimensions of certain aspects, such as flange sizes, could also be modified as is well known in the art.

Figure 5:
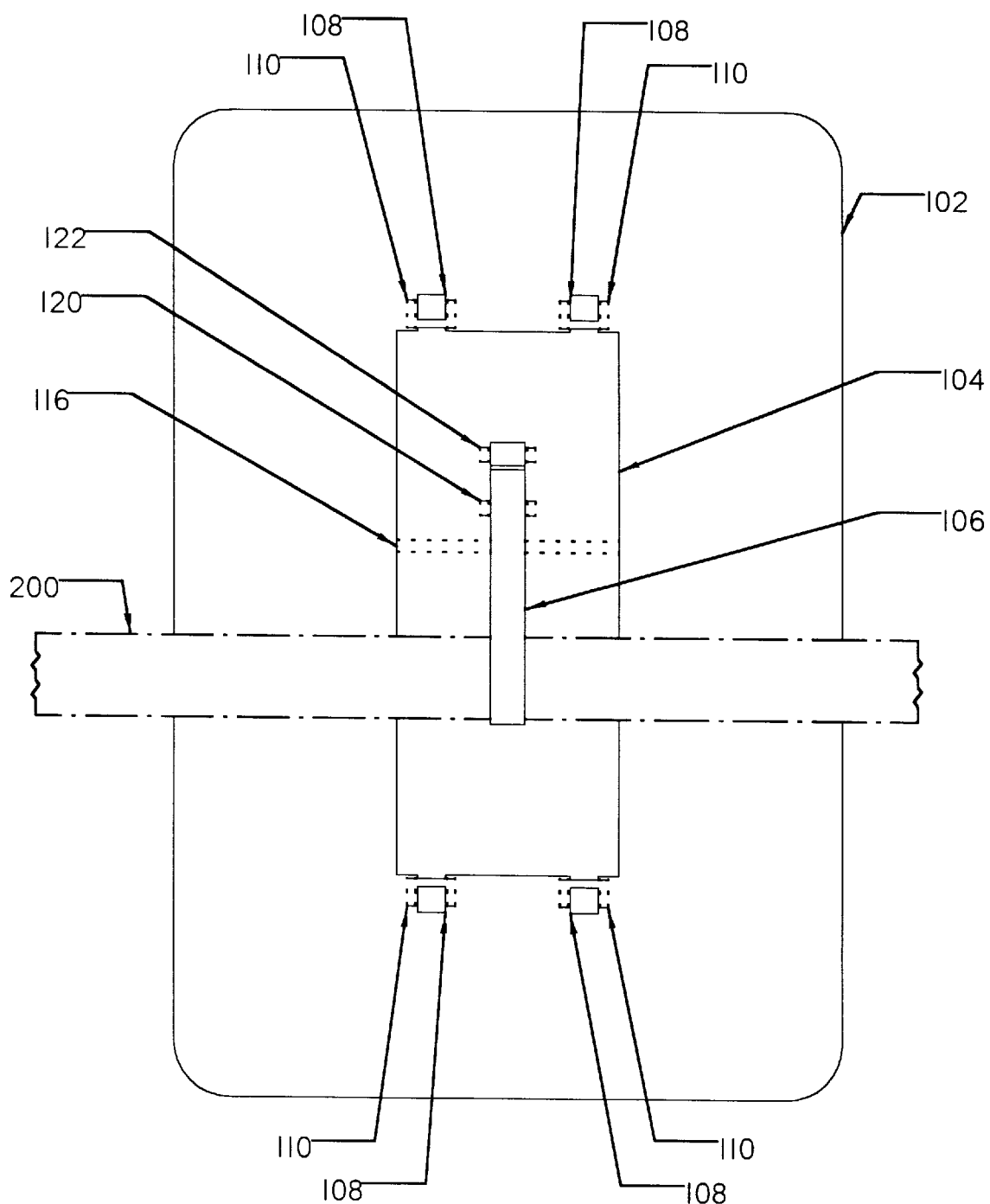
FIG. 5 is a top view of the invention.

The top view of FIG. 5 clearly shows the four point mounting provided by tabs, 108, and tab bridges 110. The load supported by strap, 106, is nearly centered over the base plate, 102, in both dimensions shown.

Figure 6:
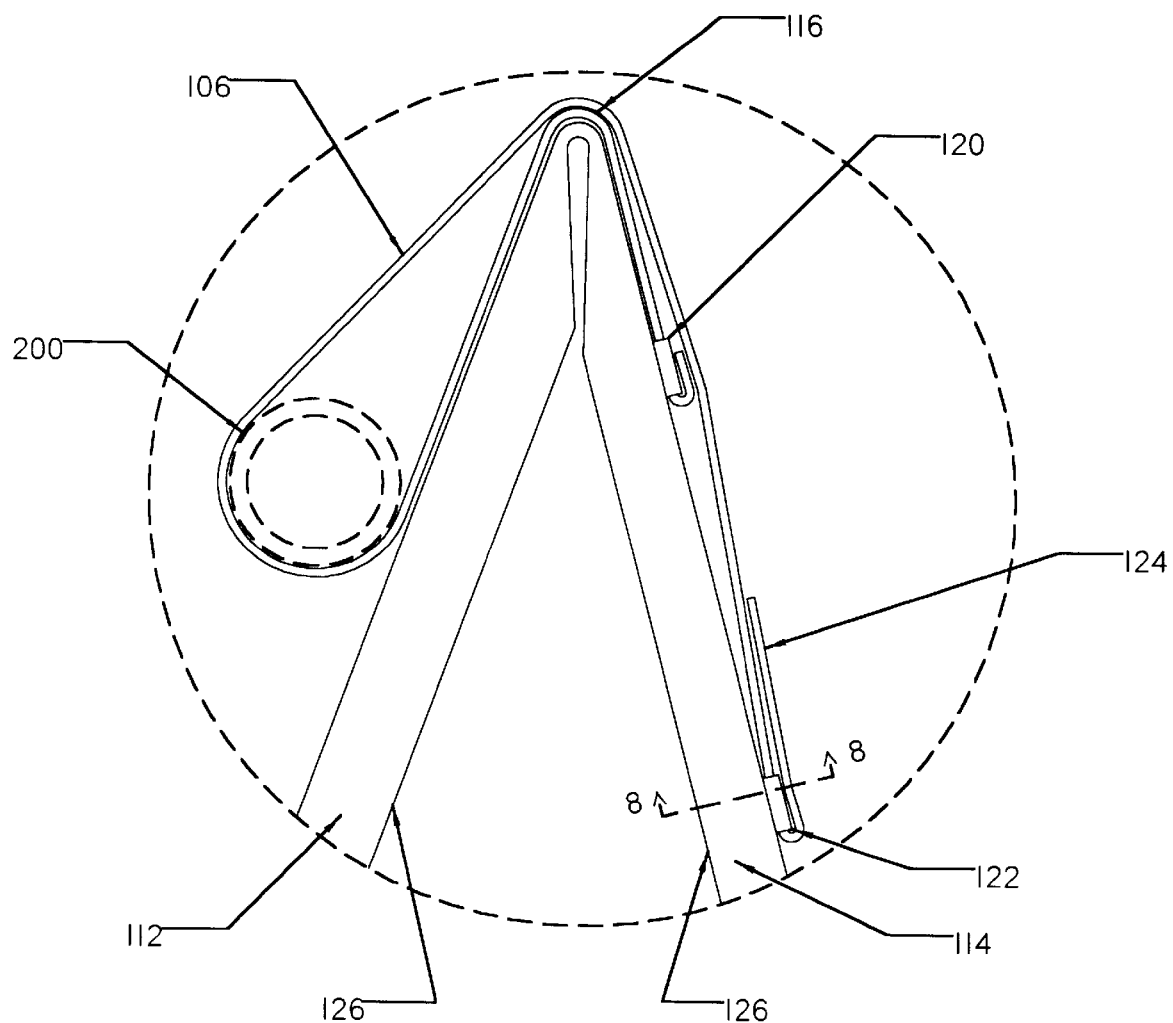
FIG. 6 is a detailed view of the support strap.

A detailed view of the strap and its retaining features is provided by FIG. 6. Strap, 106, is attached to the rear leg, 114, at tab bridge, 120, and extends upward over the fold, 116, in the support, down along the face of the front leg, 112, around the pipe, 200, back over the fold, down past its first attachment point, and through tab bridge 122. The length of the strap can be varied by adjusting the length of strap which is pulled through tab bridge, 122. When the length is correct, the tail, 124, is folded back over the protruding portion of the tab bridge, locking the strap in place. If readjustment is necessary, the tail can be unfolded, adjusted, and re-folded. Typically, the strap will be attached to tab bridge, 120, during manufacture. This serves to keep the strap attached to the support during shipping and simplifies the installer's task slightly. The length of the strap can be varied during manufacture to adapt the stand to a variety of pipe sizes. While a single strap can accommodate a significant pipe size variation, if a strap intended to accommodate a 3 inch pipe were use with a ¾ inch conduit, a very long tail would result. While the tail can be easily trimmed in the field, it may be preferable to supply a shorter strap for some applications. The width of the strap can also be varied as necessary to adjust the load capacity of the strap. The tab bridges, 120 and 122, used to retain the strap are similar in structure and functionality to the tab bridges used to retain the tabs which hold the support to the base. This simplifies the learning process for the installer as only one technique need be learned. By passing the strap over the top fold, 116, in the support twice, the slip resistance of the strap is increased significantly. Because the strap is sheet metal, it deforms as it bends around this fold. For the strap to slip, the force would have to be sufficient reverse this deformation and to bend the portion of the strap beyond the bend as it slides over the fold. This requires a significant amount of force and this force would have to be in excess of the amount required to make at least one end of the strap slip out of its tab bridge. The combination of materials and structure provides a very stable attachment which is easily adjusted without tools of any kind.

In the preferred embodiment, the fold, 116, is expected to be made in the field. The support is manufactured and shipped flat as shown in FIG. 11. As shown, all of the tabs and tab bridges, and the side flanges, 126, have been formed, but the support is not folded. A V-notch, 118, is formed in each of the side flanges of the support. These are aligned so that the apex of the notch is positioned at the opposite ends of where the fold is to be formed. The structure of the flanges and notches is such that the support will easily fold in only one location. Simply grasping the support by hand and folding it in the correct direction will result in a correctly positioned fold with little chance for error. The shape of the V-notch is such that its opposite sides will be approximately parallel after the support is folded. This provides a visual indicator to the person making the fold of how far to fold the support.

Figure 7:
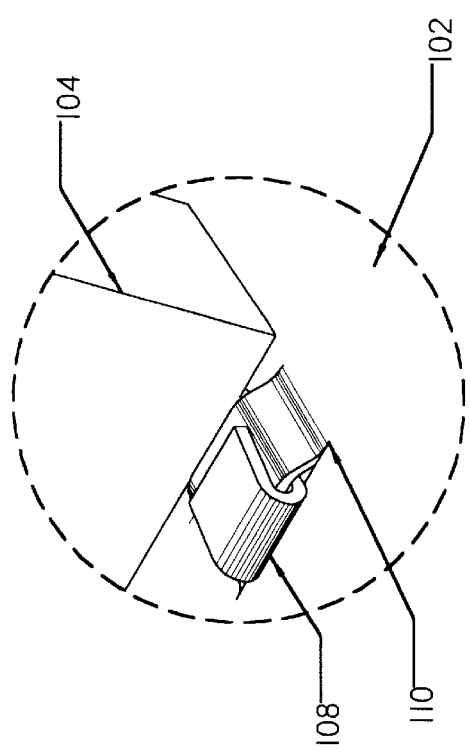
FIG. 7 is a detailed view of one of the mounting tabs.

FIG. 7 provides a detailed view of the tab and tab bridge arrangement used to hold the support, 104, to the base plate, 102. The tab bridges, 110, are raised above the surface of the base plate, providing a gap through which a tab, 108, can be inserted. The tabs are of sufficient length that after insertion, they can be folded back over the top of the tab bridge, locking them in position. In the preferred embodiment, the tab bridges are formed by stamping the sheet to which they are attached. Alternatively, a loop could be used which is a separate piece attached to the sheet.

Figure 8:
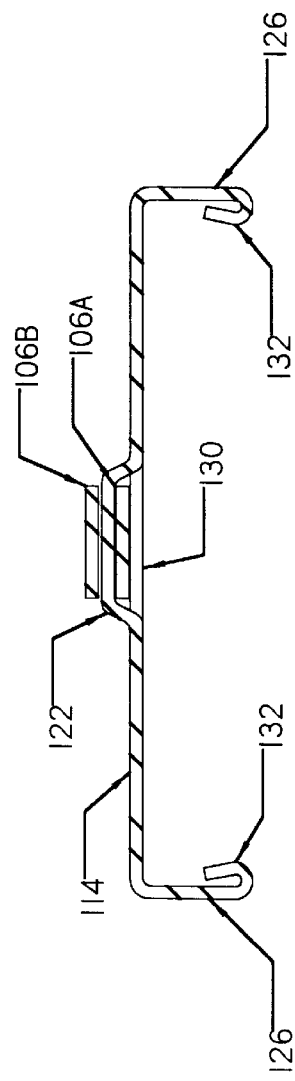
FIG. 8 is a cross section through the leg.

FIG. 8 provides a cross section through the rear leg, 114, of the support through tab bridge, 122. The view at tab bridge, 120, would be identical. A cross section through any of the tab bridges, 110, would be similar with respect to the formation and use of the tab bridge. The preferred embodiment of the tab bridge is shown wherein it is formed by stamping the base material, leaving a slot, 130, in the base material and deforming the displaced material into an arch which spans the slot. Sufficient clearance is provided between the lower face of the tab bridge and the upper face of the base material to receive the strap, 106A. After adjustment the strap is fold back along the upper surface of the tab bridge, 106B. Flanges, 126, are formed in each edge of the leg to stiffen the structure. The edges, 132, are rolled inward to further increase the rigidity and to avoid sharp edges.

Alternative Embodiments

An alternative form of the base plate, 102, would utilize flanged edges in one or both dimensions to increase the stiffness of the base plate. Further, holes in the base plate would allow for nailing or screwing the base plate to the underlying surface. Combining flanged edges and fastening down the base plate would significantly increase the resistance of the stand to tipping forces as would be encountered if the pipe shifted in a transverse direction.

Figure 9:
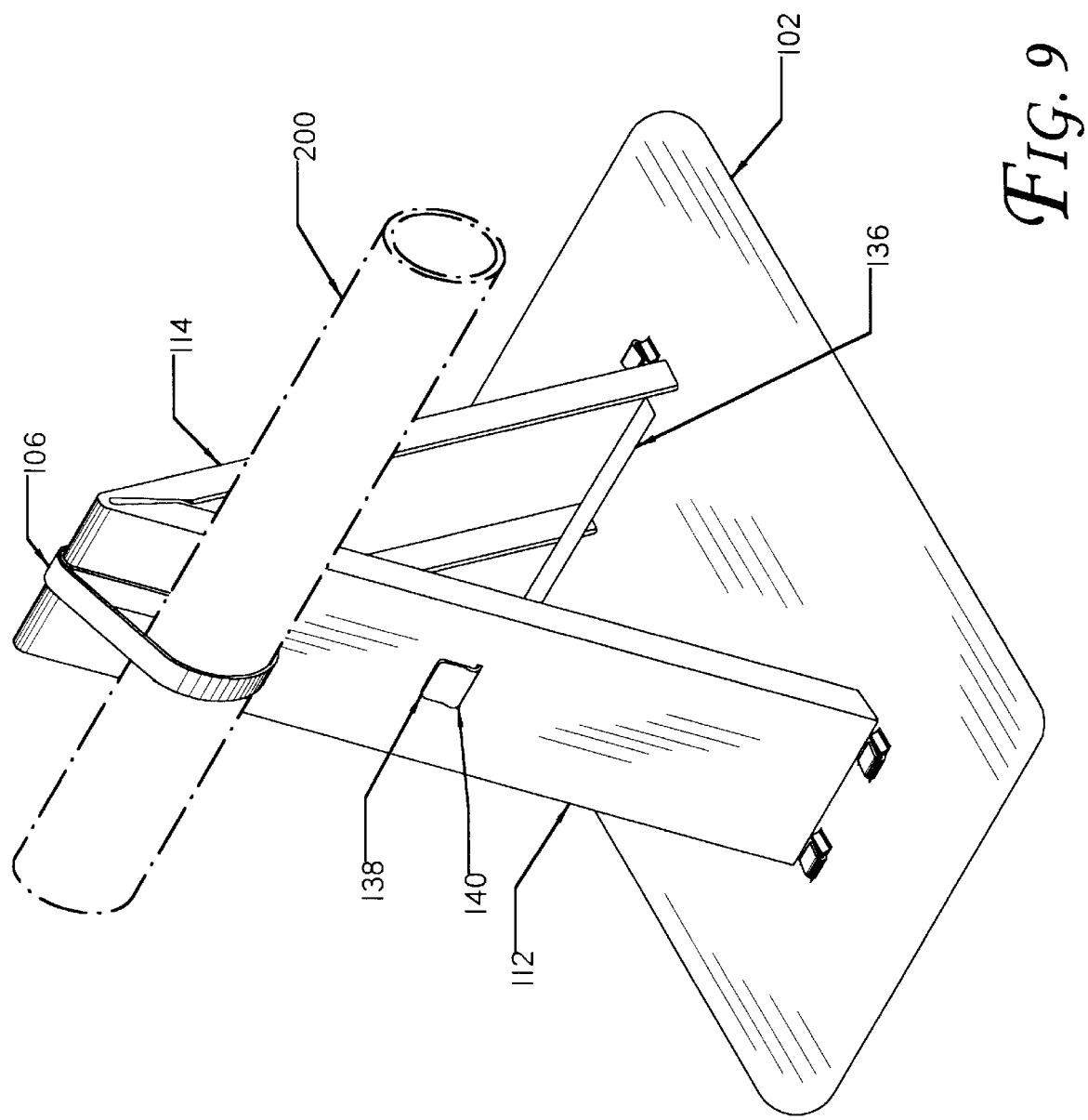
FIG. 9 illustrates an alternative, heavy duty embodiment.
Figure 10:
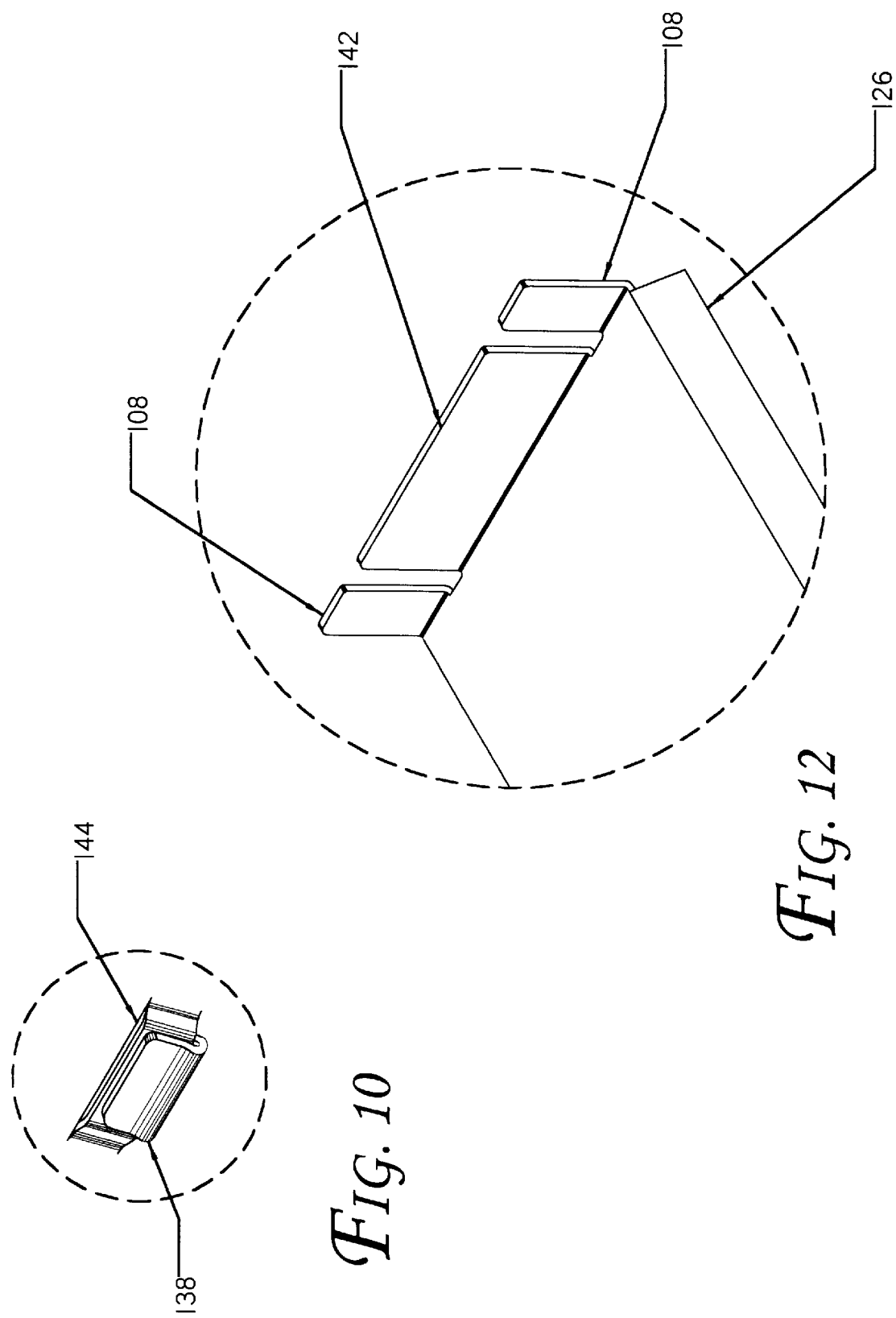
FIG. 10 is a detailed view of an alternative method of attaching the brace of the alternative embodiment.

An alternative form of the present invention, adapted to increased load capacity is shown in FIG. 9. Brace, 136, has been added which extends from the lower end of the rear leg, 114, to approximately the middle of the front leg, 112. A tab, 138, passes though slot, 140, to hold the end of the brace in position. At the lower end, a tab slips under the end of the rear leg, between the existing tabs. This brace serves to triangulate the support, significantly increasing its load capacity. If desired, the front end of the brace can be shifted upward to more directly support the pipe. Optionally, an additional set of tabs and tab bridges, similar to those used to attach the support legs to the base plate, could be used to attach the lower end of the added brace to the base plate. An alternative attachment for the upper end, shown in FIG. 10, uses a tab bridge, 144, similar in structure to those used elsewhere in the stand. This simplifies the tooling changes needed to add the brace, and allows the insertion of the brace after the stand is assembled, and even after it is in use. Because the tab, 138, is inserted downwardly through the lower opening formed by the tab bridge and then folded upward, and because the formation of the tab bridge creates a clearance gap in the leg, the lower end of the brace can be inserted under the rear leg and then the brace tilted into position with no clearance problems.

A further alternative which also increases load capacity is shown in FIG. 12. Tab, 142, is left in place between tabs, 108. This somewhat simplifies construction as this piece need not be removed, and it strengthens the support. Much of the downward force bears on tab, 142, rather than tabs, 108, spreading the force across a greater area.

In a further alternative embodiment of the invention, the base plate is eliminated and the lower ends of the support fixed directly to the roof or other supporting surface. This can be done by means of the existing tabs combined with staples, nails, or screws or the tabs can be replaced with short spikes which are inserted into the roof.

While the preferred form of the invention has been disclosed above, alternative methods of practicing the invention are readily apparent to the skilled practitioner. The above description of the preferred embodiment is intended to be illustrative only and not to limit the scope of the invention.

What is claimed is:

1. A support stand for an elongate tubular member comprising:
   (a) a first leg member, having an upper and a lower end, and an inwardly facing and outwardly facing surface;
   (b) a second leg member, having an upper and a lower end, and an inwardly facing and outwardly facing surface, said upper end hingedly attached to said first leg's upper end, forming a joint; and
   (c) means for supporting the tubular member adjacent said outwardly facing surface of one of said legs, said support means being adjustable whereby the distance between the tubular member and said joint is variable, said support means removably attached to said first leg without additional fasteners.

2. A support stand for an elongate tubular member comprising:
   (a) a first leg member, having upper and a lower end;
   (b) a second leg member, having an upper and a lower end, said upper end hingedly attached to said first leg's upper end, and
   (c) means for supporting the tubular member at a variable height with respect to at least one of said leg members, said support means removably attached to said first leg without additional fasteners;
wherein said variable height support means comprises a strap removably attached at one end to said first leg and said first leg further comprises a tab bridge adapted to receive the distal end of said strap and wherein said variable height is achieved by passing said distal end around the tubular member and then through said tab bridge to the desired length and then folding said distal end around said tab bridge in the reverse direction.

3. The support stand of claim 2 wherein said strap passes over said hinged attachment between said first leg and said second leg before passing around the tubular member, and said strap passes over said flexible attachment a second time before passing through said tab bridge, whereby said tubular member is supported adjacent to said second leg.

4. The support stand of claim 3 wherein all members are formed from sheet metal.

5. A support stand for an elongate tubular member comprising:
   (a) a base member:
   (b) a first leg member, having an upper and a lower end;
   (c) a second leg member, having an upper and a lower end, said upper end hingedly attached to said first leg's upper end;
   (d) means for removably attaching said first leg's lower end and said second leg's lower end to said base member without fasteners;
   (e) means for supporting the tubular member, said support means attached to said first leg; and
   (f) brace means having a first and second end, and means for releasably attaching said first end to said lower end of said first leg, and means for attaching said second end to said second leg at or above the middle of said second leg.

6. A support stand for an elongate tubular member comprising:
   (a) a base member;
   (b) a first leg member, having an upper and a lower end, and an inwardly facing and outwardly facing surface;
   (c) a second leg member, having an upper and a lower end, and an inwardly facing and outwardly facing surface, said upper end hingedly attached to said first leg's upper end, forming a joint;
   (d) means for removably attaching said first leg's lower end and said second leg's lower end to said base member without fasteners; and
   (e) means for supporting the tubular member adjacent said outwardly facing surface of one of said legs, said support means being adjustable whereby the distance between the tubular member and said joint is variable, said support means attached to said first leg.

7. The support stand of claim 6 wherein said attachment means comprises plural tab bridges fixed to said base member and plural tabs fixed to said lower ends, each of said tabs adapted to pass through one of said tab bridges and be folded around said tab bridge in the reverse direction.

8. The support stand of claim 6 wherein said variable height support means is adjustable without requiring the use of tools.

9. The support stand of claim 8 wherein said variable height support means comprises a strap removably attached at one end to said first leg and wherein first leg further comprises a tab bridge adapted to receive the distal end of said strap and wherein said variable height is achieved by passing said distal end around the tubular member and then through said tab bridge to the desired length and then folding said distal end around said tab bridge in the reverse direction.

10. The support stand of claim 9 wherein said strap passes over said hinged attachment between said first leg and said second leg before passing around the tubular member, and said strap passes over said flexible attachment a second time before passing through said tab bridge, whereby said tubular member is supported adjacent to said second leg.

11. The support stand of claim 10, wherein said first leg and said second leg are unequal in length.

12. The support stand of claim 11, wherein all members are formed from sheet metal.

13. A method of supporting an elongate tubular member above the surface of a roof, or the like; the method comprising:

(a) providing a base member;

(b) releasably attaching to said base member, without fasteners, a support member comprising a first and second leg hingedly attached at their upper ends, said first leg comprising a tab bridge;

(c) providing a strap, fixed at a first end to said first leg; and (d) passing said the distal end of said strap around the tubular member and then through said tab bridge;

(e) adjusting the height at which the tubular member is supported by varying the length of said strap which is pulled through said tab bridge; and (f) fixing the length of said strap by folding said strap around said tab bridge in the reverse direction.

* * * * *